United States Patent Office 3,803,153
Patented Apr. 9, 1974

3,803,153
BENZOPYRANO PYRIDINES
Frank J. Villani, West Caldwell, N.J., assignor to
Schering Corporation, Bloomfield, N.J.
No Drawing. Continuation-in-part of application Ser. No. 90,004, Nov. 16, 1970, which is a continuation-in-part of application Ser. No. 872,728, Oct. 30, 1969, which in turn is a continuation-in-part of application Ser. No. 629,404, Apr. 10, 1967, all now abandoned. This application Jan. 16, 1973, Ser. No. 324,024
Int. Cl. C07d 39/06
U.S. Cl. 260—293.53
32 Claims

ABSTRACT OF THE DISCLOSURE

This invention relates to novel compositions of matter classified in the art of chemistry as benzopyrano pyridine derivatives, to processes for making and using such compositions as bronchodilators and to the intermediates valuable in the preparation thereof.

---

This application is a continuation-in-part of my earlier filed application, Ser. No. 90,004, filed Nov. 16, 1970, now abandoned, which in turn is a continuation-in-part of my earlier filed application, Ser. No. 872,728, filed Oct. 30, 1969, now abandoned, which in turn is a continuation-in-part of my earlier filed application, Ser. No. 629,404, filed on Apr. 10, 1967, now abandoned.

The invention sought to be patented in one of its composition of matter aspects is described as residing in the concept of a benzopyrano pyridine, the tricyclic nucleus of which has the following structural formula:

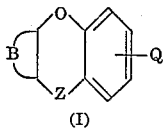

(I)

and the pharmaceutically acceptable acid addition salts thereof, wherein B, together with the carbon atoms to which it is attached, represents a fused pyridine ring, Q is a member of the group consisting of hydrogen, lower alkyl, halogen, lower alkoxy and hydroxy, Z is a member of the group consisting of

and

wherein A is a member of the group consisting of piperidyl, quinuclidyl and

W is a member of the group consisting of H and OH, and D is a member of the group consisting of piperidylidene, quinuclidylidene and

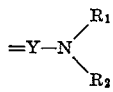

wherein $R_1$ and $R_2$ are members of the group consisting of hydrogen and lower alkyl and X and Y are respectively saturated lower aliphatic hydrocarbyl and hydrocarbylidene radicals containing two to four carbon atoms.

The novel compounds of Formula I are in essence "final products," although as it will be described later, some of the "final" products have the additional utility of being intermediates in the preparation of other "final" products.

The correct nomenclature of the compounds of this invention is that approved by Chemical Abstracts, the naming of which is illustrated by the following structural formulae or their ketone intermediates:

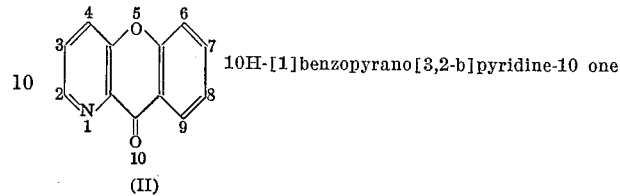

10H-[1]benzopyrano[3,2-b]pyridine-10 one (II)

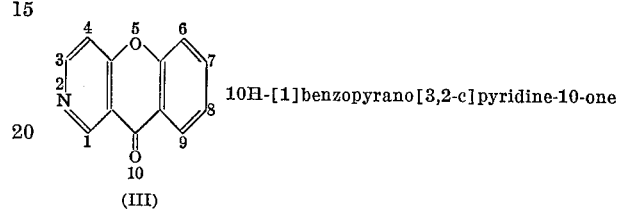

10H-[1]benzopyrano[3,2-c]pyridine-10-one (III)

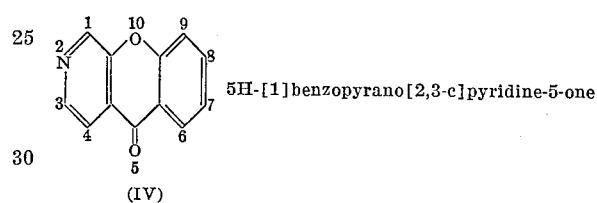

5H-[1]benzopyrano[2,3-c]pyridine-5-one (IV)

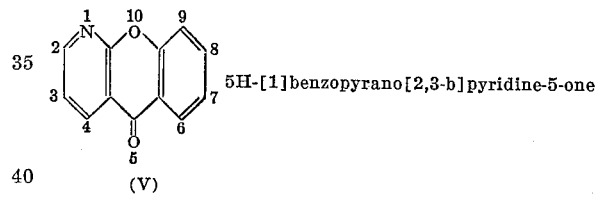

5H-[1]benzopyrano[2,3-b]pyridine-5-one (V)

Although the foregoing nomenclature is the approved method of naming the tricyclic nucleus of the compounds of this invention, the compounds will also sometimes be hereinafter referred to as derivatives of aza-xanthenes corresponding to the foregoing Formulae II, III, IV and V, all of which may be generically represented by the structural formula:

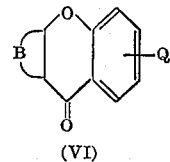

(VI)

wherein B and Q are as previously described.

Embraced within the composition aspect of the concept represented by Formula VI are the 1-aza, 2-aza, 3-aza and 4-aza xanthene 5-ones, corresponding to the compounds depicted in Formulae V, IV, III and II, respectively. It is also apparent that the compounds of Formula I are amines attached to an aza-xanthene nucleus at the 5-position thereof through a hydrocarbon connecting link wherein at least two carbon atoms separate the nitrogen atom from the 5-position carbon atom of the tricyclic nucleus. By way of furher definition, those compounds falling within Formula I wherein W represents hydroxy, are sometimes referred to as "carbinols," those wherein W represents H are sometimes referred to as "saturated compounds" and those having a doubly bound substituent D, are sometimes referred to as "unsaturated compounds" or "alkylidene compounds."

The substituent A, as described herein includes a limited number of amino substituents exemplified by 3-piperidyl, 4-piperidyl, N-lower alkyl (preferably methyl) 3- and 4-piperidyl, N-trifluoroethyl-3- and 4-piperidyl, and 3-quinuclidyl. Included within the definition of A is the group

with X being defined as a hydrocarbyl group having 2 to 4 carbon atoms exemplified by ethyl, propyl and isobutyl. The

moiety is defined as amino, lower alkylamino (preferably methyl amino) and di-lower alkyl amino (preferably dimethyl amino). Representative of the D moiety are those radicals defined for A but being attached to the 5-position carbon atom of the tricyclic nucleus through a double bond. Representative of the D moiety are such radicals as 3-piperidylidene, 4-piperidylidene, N-methyl - 3 - piperidylidene, N-methyl-4-piperidylidene, 3-quinuclidylidene, N-trifluoroethyl-4 - piperidylidene, N - trifluoroethyl - 3-piperidylidene, dimethylaminopropylidene, methylaminopropylidene, dimethylaminoethylidene, and dimethylamino-2-methylpropylidene.

Representative of the Q substituents in the benzenoid moiety of the tricyclic nucleus are halogeno (preferably chloro and bromo), lower alkyl (preferably methyl), lower alkoxy (preferably methoxy) and hydroxy.

Preferably the substituents are located in the 7- and/or 8-positions of the aza-xanthene nucleus.

The compounds contemplated as falling within Formula I are basic in character and form acid addition salts with acids. These salts sometimes increase solubility and lend themselves better to formulation than do the free bases. Accordingly, the pharmaceutically acceptable acid addition salts of the free bases are contemplated as being within the concept in its composition aspect. Such salts include those derived from maleic, salicylic, succinic, methyl sulfonic, tartaric, citric, hydrochloric, hydrobromic, sulfuric, phosphoric and the like.

In one of its process aspects, the invention sought to be patented resides in the concept of producing a compound of Formula I by reacting a 5 keto-aza-xanthene with an organometallic compound bearing an amino substituted group embraced by the substituent A and hydrolyzing the complex thereby formed. The organometallic reactant may be a Grignard type reagent such as N-methyl-4-piperidyl magnesium halide, preferably chloride or bromide. This step may be summarized by the following reaction sequence:

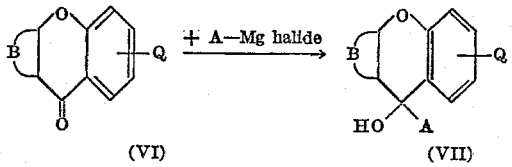

wherein A, B and Q are as previously defined. This reaction is limited to the production of those carbinols of Formula I wherein the substituent A contains at least three carbon atoms separating the amino group from the 5-position of the tricyclic nucleus. Any free amino group, such as a primary or secondary amine, must be protected prior to formation of the organometallic reactant in order to prevent these groups from reacting with the metalloorganic reagent. I prefer to protect free amine groups with benzyl or carboethoxy groupings. The carbinol so formed will accordingly contain the blocking group which is easily cleaved by catalytic hydrogenation and/or hydrolysis to regenerate the corresponding amine.

In a preferred procedure, a 5-keto-aza-xanthene (VI) is added either in solid form or in solution in an inert solvent to a Grignard reagent containing the substituent A which is also in an inert solvent such as, for example, ether, benzene, tetrahydrofuran and the like. Representative of the organometallic reactant are N - methyl - 4-piperidyl magnesium chloride, dimethylaminopropyl magnesium chloride, and the like which are prepared in a known manner from magnesium and the corresponding amino alkyl halide. The reaction mixture may be heated, preferably under reflux, after which time it is subjected to hydrolysis. Hydrolysis under practically neutral conditions such as is effected by ammonium chloride results in formation of the carbinol (VII) which is isolated from the reaction mixture by extraction with a water-immiscible solvent such as ether, chlorinated hydrocarbons and the like. The carbinols of Formula I, may be utilized as such or in the form of their acid addition salts.

The carbinols are valuable intermediates in the production of the unsaturated compounds of Formula I, that is those compounds wherein Z represents >C=D. The carbinols are relatively easily dehydrated to produce an exocyclic unsaturated compound of Formula I. The dehydration may be effected by heating the carbinol with known dehydrating agents such as alcoholic hydrogen chloride, phosphorous oxychloride, phosphoric acids such as polyphosphoric acid, sulfuric acid, zinc chloride, alkali pyrosulfate and other similarly acting agents. These unsaturated products (wherein Z of Formula I represents >C=D) may be isolated as free bases or in the form of their acid addition salts. Thus, the dehydration of the carbinols to produce the corresponding unsaturated analog represents a further aspect of the process concept of the invention sought to be patented.

A further utility of the exocyclically unsaturated compounds described above is that wherein they serve as intermediates in the preparation of the saturated compounds of Formula I (wherein Z represents

These saturated compounds are prepared by catalytic hydrogenation of the double bond preferably with palladium and hydrogen.

The saturated compounds of Formula I (wherein A represents

are also preparable by direct alkylation of an aza-xanthene according to the following reaction scheme:

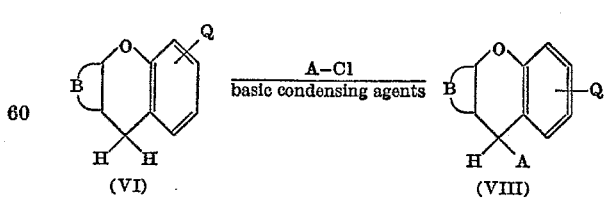

In the foregoing reaction scheme, the substituents A, B, and Q have the same meaning as described heretofore. This reaction constitutes the condensation of an organic halide (preferably chloride or bromide) bearing the substituent A, with an appropriate aza-xanthene. The reaction is carried out in an inert solvent such as ether, toluene or xylene, preferably at reflux temperature, and in the presence of a condensing agent such as sodamide or potassium amide. Representative of the halides which may be used in this reaction are dimethylaminopropyl chloride, dimethylaminoethyl chloride and the like. The reaction product is obtained by neutralization of the mixture with mineral acid, followed by treatment with aqueous alkali and extraction with a water immiscible solvent.

A method of preparing the unsaturated compound analogs wherein the substituent A or D has only two carbon atoms separating the amino moiety from the 5-position of the tricyclic nucleus is that which first involves the condensation of a 5-keto-aza-xanthene (VI) with a bromoacetic ester (preferably ethyl bromoacetate) in the presence of zinc, the well known Reformatsky condensation, which gives rise to a carbethoxy intermediate IX:

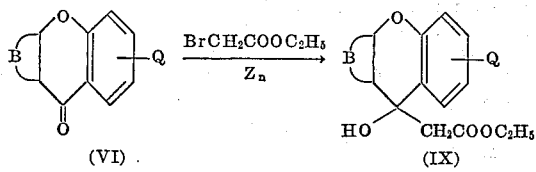

In the foregoing reaction, B and Q have the same significance as ascribed heretofore. The reaction is effected in an inert solvent such as refluxing toluene or xylene and the product, IX, separated therefrom according to methods well known in the art. The ester, IX, is then subjected to dehydration such as by heating with thionyl chloride to afford the exocyclically unsaturated analog, X, which is saponified by treatment with acid or alkali to yield the carboxylic acid, XI. The carboxylic acid, XI, is converted into an amide, XII, by first forming the acid chloride by means of thionyl chloride followed by reaction with the amine $HNR_1R_2$. This sequence of reactions is depicted in the following scheme and for convenience only the 5-position of the tricyclic system is shown.

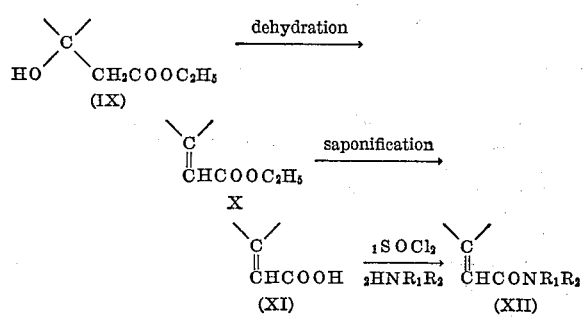

In this reaction sequence, $-NR_1R_2$ has the same significance as ascribed heretofore but is preferably a tertiary amino group. Selective reduction of the amide group by means of lithium aluminum hydride, for example, yields the amino alkylidene, XIII, which may be further saturated to yield the aminoalkyl, XIV, by catalytic hydrogenation with palladium.

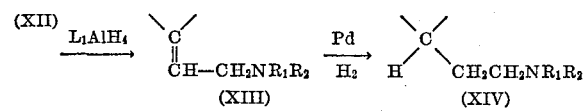

Compounds XIII and XIV are representative of those of Formula I having two carbons separating the amino group $-NR_1R_2$ from the 5-position of the tricyclic nucleus.

A further approach to the preparation of the "alkylidene compounds" of this invention is that whereby essentially all groups are present (i.e. the A substituent is attached) except for the bonding of the 5-position to the benzenoid ring. For example, reacting 3-phenoxy-2-cyanopyridine with N-methyl-4-piperidylidene magnesium chloride forms the intermediate ketone which upon cyclic dehydration with polyphosphoric acid to form the desired exocyclically unsaturated compounds. Quite obviously this cyclic dehydration goes thru an imino intermediate (e.g.

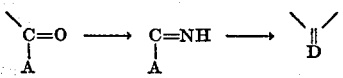

wherein A and D are as previously defined) and thus the cyclic dehydration of either and/or the keto or imino intermediates are included.

In addition to the foregoing methods of preparation for the compounds of this invention the unsaturated compounds of this invention may alternatively be prepared by the following sequence of reactions which for the sake of convenience show only the 5-position of the tricyclic system:

The 5-keto intermediates of Formula VI are prepared by a variety of procedures of which I prefer an intramolecular cyclization of a phenoxy pyridine carboxylic acid according to the following scheme:

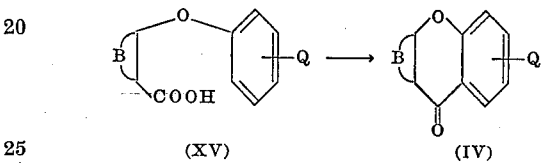

wherein the B and Q designations are as hereinabove defined. The cyclization of the phenoxy pyridine carboxylic acid (XV) is preferably effected by heating the acid with polyphosphoric acid in the temperature range of about 100° to 160° C. whereby the cyclization occurs resulting in the formation of the ketone. Quite apparently, the choice of the phenoxy pyridine carboxylic acid will determine the particular isomer produced. Alternatively, the cyclization may advantageously be effected (e.g. in the preparation of 7-chloro-10H[1]benzopyrano[3,2-b]-pyridine-10-one from 3-(3-chlorophenoxy)picolinic acid so as to insure the minimization of the formation of 9-chloro-10H[1]benzopyrano[3,2-b]-pyridine-10-one) by an intramolecular Friedel-Crafts reaction. By this method the carboxylic acid is first converted to its acid chloride such as by means of thionyl chloride (or phosphorous trichloride or oxalyl chloride for example) followed by treatment with aluminum chloride, whereby cyclization occurs. The cyclization is carried out according to standard techniques for effecting a Friedel-Crafts reaction, namely heating the mixture in an inert solvent such as carbon disulfide, petroleum ether, benzene and the like and isolating the cyclized product therefrom.

The 4-aza ketones of Formula II are preferably prepared by the following sequence of reactions:

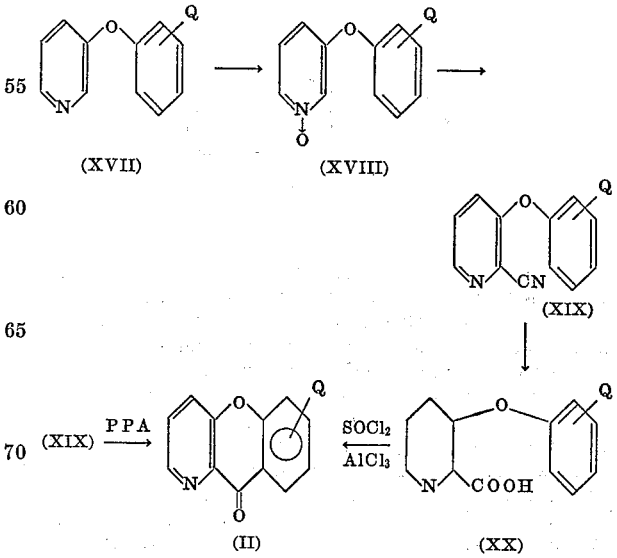

wherein Q is as previously defined.

In this sequence the phenoxy pyridine (XVII) is converted to its N-oxide by reaction with a peroxy acid such as hydrogen peroxide and acetic acid or m-chlorperbenzoic acid. Reacting this N-oxide in turn with dimethyl sulfate and then aqueous sodium cyanide gives rise to the nitrile (XIX) which may be cyclized directly by heating with polyphosphoric acid or else it may be first hydrolyzed to the carboxylic acid (XX) and then cyclized through the acid chloride with aluminum chloride, The preparation of the 3-aza ketones is effected by the following reaction sequence by techniques herein described:

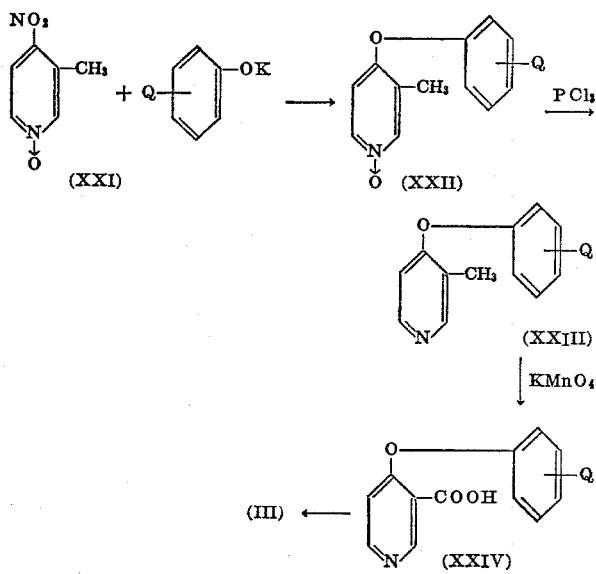

Q being as previously defined.

The preparation of the 2-aza ketones is effected by the following reaction sequence:

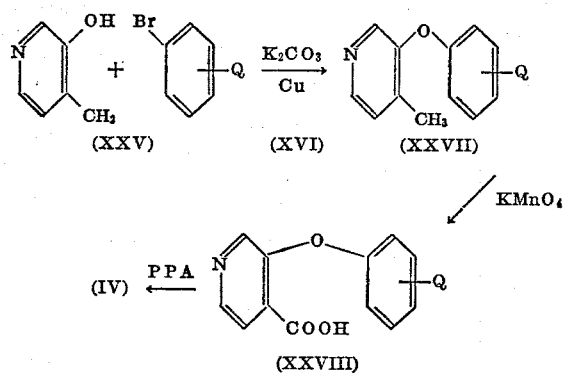

The preparation of the 1-aza ketones is effected by heating 2-chloro nicotinic acid with an appropriate Q-substituted phenol and cyclizing the 2-phenoxy nicotinic acid by heating with polyphosphoric acid, or by herein described alternative cyclization with aluminum chloride.

The preparation of aza-xanthenes, i.e., those compounds of Formula VI wherein the 5-keto group is reduced to a methylene ($CH_2$) moiety, is accomplished by first chemically reducing the 5-keto moiety to the corresponding carbinol which in turn, is reduced to the methylene. This can be effected with sodium borohydride, with zinc dust in ammonia, or by catalytic reduction using platinum oxide or Raney nickel. The carbinols may be converted to the methylene by chlorinating with thionyl chloride and then replacing the chlorine atom with hydrogen by refluxing the chloro intermediate in the presence of a mixture containing zinc dust, potassium iodide and acetic acid.

PREPARATION A.—4-AZA-XANTHENE-5-ONES

Example I

10H[1]benzopyrano[2,3-b]pyridine-10-one

Step I.—Dissolve 56.7 g. of meta chlorperbenzoic acid in 750 ml. of dry chloroform. Add a solution containing 51.3 g. of 3-phenoxypyridine in 100 ml. of chloroform and allow the resulting mixture to stir at room temperature for 20–24 hrs. Wash the reaction mixture with consecutive washings using 20% aqueous potassium iodide, 20% sodium thiosulfate, 20% sodium hydroxide solution and water. Concentrate the washed reaction mixture on a steam bath and triturate with petroleum ether. Recrystallize the product from benzene/petroleum ether (50:50) to yield 3-phenoxypyridine-N-oxide, M.P. 78–80° C.

Step II.—In a round bottom flask, melt 43 g. of the N-oxide of Step I at 80–85° C. and, in a dropwise fashion, maintaining the temperature of 80–85° C., add 29 g. of dimethyl sulfate over a period of 1–2 hours. Heat the resulting mixture on a steam bath for two hours. Cool and dissolve the product in 70 ml. of water, maintaining the water solution in the temperature range of 0–10° C. Bubble nitrogen gas over a freshly prepared solution of sodium cyanide (33.8 g.) for one hour, keeping the solution at 0–5° C. Add the N-oxide product to the sodium cyanide solution, maintaining the temperature at 0–5° C. during the addition (2–3 hrs.) and allow the resulting mixture to come to room temperature, stirring the mixture for 10 hours under a blanket of nitrogen gas. Extract the reaction mixture with chloroform and water-wash the extract. Remove the chloroform by evaporation and recrystallize the product from benzene hexane to yield the desired 2-cyano-3-phenoxypyridine, M.P. 75–76° C.

Step III.—Heat a mixture of 34.5 g. of the 2-cyano-3-phenoxypyridine and 1380 g. of polyphosphoric acid at 195–200° C. for 4–6 hours. Cool the reaction mixture, pour into ice and basify with sodium hydroxide. Extract the product with chloroform, water wash the chloroform extract, evaporate off the chloroform and recrystallize the residue from benzene petroleum ether to yield the desired 10H[1]benzopyrano[3,2-b]pyridine - 10 - one, M.P. 204–205° C.

Step IV.—At reflux temperatures, heat a mixture containing 25 g. of the 2-cyano-3-phenoxypyridine, 25 g. of potassium hydroxide, 200 ml. water and 500 ml. of ethanol for 20–26 hours. Concentrate in vacuo and dissolve the residue in a minimal amount of water. Acidify with acetic acid, filter and air dry the resulting 3-phenoxy picolinic acid.

Step V.—Suspend 10.8 g. of the 3-phenoxy picolinic acid in 150 ml. of dry benzene and add at 10–15° C. 10 ml. of thionyl chloride. Heat the reaction mixture on a steam bath for 2 hours, remove the solvents in vacuo, add 350 ml. of carbon disulfide and with vigorous stirring, add 13 g. of anhydrous aluminum chloride and allow the reaction mixture to stir for 19 hours. Remove the excess carbon disulfide add 500 ml. of water and 100 ml. of concentrated hydrochloric acid to the residue. Extract this solution with chloroform and discard the chloroform extracts. Basify the aqueous solution with sodium hydroxide. Extract the desired product with chloroform. Evaporate off the chloroform and recrystallize the desired product from benzene petroleum ether to yield 10H[1]-benzopyrano[2,3-b]pyridine-10-one, M.P. 204–205° C.

Example II 7-chloro-10H[1]benzopyrano[3,2-b]pyridine-10-one

Heat at 190–200° C. for 4 hours, a mixture containing 31.6 g. of 3-bromo pyridine, 51.2 g. of m-chloro phenol, 5 g. of copper powder and 55.2 g. of anhydrous potassium carbonate. Dissolve the resulting mixture in water making strongly basic with sodium hydroxide and steam distil the resulting mixture. Extract the steam distillate with several portions of ether. By following the teachings of Steps II, IV, and V of Example I, there is produced 7-chloro-10H[1]benzopyrano[3,2-b]pyridine-10-one.

PREPARATION B.—3-AZA XANTHENE-5-ONES

Example III

10H[1]benzopyrano[3,2-c]pyridine-10-one

Step I.—Stir on a steam bath for 4 hours a mixture containing 30.8 g. of 4-nitro-3-picoline-N-oxide, 37.6 g. of phenol and 27.6 g. of potassium carbonate. Dissolve the resulting mixture in water and make strongly basic with sodium hydroxide. Extract the product with chloroform, evaporate off the chloroform and recrystallize the residue from benzene petroleum ether to yield 4-phenoxy-3-picoline-N-oxide, M.P. 113–116° C.

Step II.—Dissolve 15 g. of the N-oxide prepared in Step I in 250 ml. of chloroform and cool the solution to 0–5° C. To the cooled solution add, in a dropwise fashion, with constant stirring, a solution of 30.8 g. of phosphorous trichloride in 50 ml. of chloroform. After completion of the addition of phosphorous trichloride, reflux the mixture for 3 hours, cool to room temperature and pour into a large volume of ice water. Basify the mixture with sodium hydroxide and extract with several portions of chloroform. Distil off the chloroform and distil the residue to yield 4-phenoxy-3-picoline, B.P. 104–107° C./0.4 mm.

Step III.—Suspend 35 g. of 4-phenoxy-3-picoline in 4 l. of water and heat the suspension to 70–80° C. Add in several small portions over a period of 6 hours, 90 g. of potassium permanganate. Stir and heat the mixture for 12 hours at 70–80° C. Filter the resulting mixture, wash the filter cake with hot water and concentrate the filtrate to approximately 800–900 ml. Acidify the filtrate with acidic acid. Add a saturated water solution of copper sulfate until the precipitation of the copper salt is complete. Filter the copper salt, water wash and suspend the salt in hot water. Saturate the solution with hydrogen sulfide. Filter off the copper sulfide and concentrate the filtrate to dryness. Recrystallize the residue from ethanol to yield 4-phenoxy nicotinic acid, M.P. 133–135° C.

Step IV.—Heat 20 g. of 4-phenoxy nicotinic acid with 800 g. of polyphosphoric acid for 4–6 hours at 140–145° C. Pour the resulting mixture into ice water and basify with sodium hydroxide. Extract the solution with chloroform and evaporate off the chloroform to obtain a residue which is triturated with petroleum ether and recrystallize from isopropyl ether to yield 10H[1]benzopyrano[3,2-c]pyridine-10-one, M.P. 190–191° C.

PREPARATION C.—2-AZA-XANTHENE-5-ONES

Example IV

5H[1]benzopyrano[2,3-c]pyridine-5-one

Step I.—Heat at 230–250° C., a mixture containing 65.4 g. of 3-hydroxy-4-picoline, 78.5 g. of bromobenzene, 82.8 g. of potassium carbonate and 6 g. of copper powder for 3 hours. Pour the resulting mixture into water and make strongly basic with sodium hydroxide and steam distil the resulting mixture to collect about 8 l. of distillate. Saturate the distillate with salt and extract with ether. Dry the ether extract (sodium chloride) and distil to obtain 4-methyl-3-phenoxypyridine, B.P. 133–135° C./10 mm.

Step II.—Suspend 40 g. of 4-methyl-3-phenoxy pyridine, 4 l. of water and warm the resulting suspenison to 70° on a steam bath. Add, in several portions, 79 g. of potassium permanganate and stir the resulting mixture for 20 hours at 70° C. Filter the resulting mixture, wash the filter cake with hot water and concentrate the filtrates to approximately ½ the volume. Acidify the concentrated filtrate with acetic acid. Filter and recrystallize the 3-phenoxy isonicotinic acid from dilute ethanol, M.P. 235–237° C.

Step III.—Using the product of Step II, follow the procedure of Preparation B, Step III, to effect cyclization to obtain 5H[1]benzopyrano[2,3-c]pyridine-5-one, M.P. 157–158° C.

PREPARATION D.—1-AZA-XANTHENE-5-ONES

Example V

5H[1]benzopyrano[2,3-b]pyridine-5-one

Dissolve 120 g. of sodium methoxide in 700 ml. of methanol, add 440 g. phenol and 157 g. of 2-chloronicotinic acid. Evaporate off the methanol solvent and heat the residue at 180–190° C. for 1 hour. Pour the resulting mixture into ice water and acidify the mixture with acetic acid to produce 2-phenoxy nicotinic acid, M.P. 172–180° C.

Step II.—Heat 168.3 g. of 2-phenoxy nicotinic acid with 6000 g. of polyphosphoric acid at 120° C. for 5 hours and pour the resulting mixture into water. Basify with sodium hydroxide and filter off the ketone. Water wash thoroughly until the extracts are no longer basic. Air dry the desired 5H[1]benzopyrano[2,3-b]pyridine-5-one, which is recrystallized from benzene or ethanol to yield the product with a M.P. of 178–182° C.

The foregoing preparations set forth methods for synthesizing intermediates in the preparation of final compounds of Formula I. With the exception of Example II, these preparations give rise to an aza-xanthene-5-one, unsubstituted in the benzenoid ring. As previously stated, to prepare the ketones having substituents at one or more of the 6-, 7-, 8- and 9-positions, one merely employs the appropriately Q-substituted reactant. If these reactants are substituted the Q substituent will appear in the benzeneoid moiety of the aza-xanthene, the position being dependent upon the position in the initial reactant. Thus, the initial reactant may bear an ortho, meta, or para substituted chloro, bromo, hydroxy or methoxy (or a protecting group which is later cleaved to the free hydroxyl which is then converted to a methoxy radical). In those instances wherein the Q-substituted reactants give rise to isomers upon cyclization, it is preferred to separate such isomers by column chromatography whereby the mixture is absorbed on alumina and eluted with benzene/hexane fractions containing varying proportions of solvent. Combination of like eluates as determined by infra-red, ultra-violet and thin layer chromatographic techniques, provides for separation and isolation of the respective isomers. The Q-substituted aza-xanthenes reactants may be prepared from techniques well known to one of ordinary skill in the art. Representative of such Q-substituted ketones are:

7-chloro-10H[1]benzopyrano[3,2-b]pyridine-10-one;
7-bromo-10H[1]benzopyrano[3,2-b]pyridine-10-one;
7-methoxy-10H[1]benzopyrano[3,2-b]pyridine-10-one;
7,8-dimethoxy-10H[1]benzopyrano[3,2-b]pyridine-10-one;
8-chloro-10H[1]benzopyrano[3,2-b]pyriidne-10-one;
7-chloro-10H[1]benzopyrano[3,2-c]pyridine-10-one;
7-bromo-10H[1]benzopyrano[3,2-c]pyridine-10-one;
7-methoxy-10H[1]benzopyrano[3,2-c]pyridine-10-one;
7,8-dimethoxy-10-H[1]benzopyrano[3,2-c]pyridine-10-one;
7,8-dihydroxy-10H[1]benzopyrano[3,2-c]pyridine-10-one;
8-chloro-10H[1]benzopyrano[3,2-b]pyridine-10-one;
8-chloro-10H[1]benzopyrano[3,2-c]pyridine-10-one;

8-chloro-5H[1]benzopyrano[2,3-c]pyridine-5-one;
8-bromo-5H[1]benzopyrano[2,3-c]pyridine-5-one;
8-methoxy-5H[1]benzopyrano[2,3-c]pyridine-5-one;
7,8-dimethoxy-5H[1]benzopyrano[2,3-c]pyridine-5-one;
7,8-dihydroxy-5H[1]benzopyrano[2,3-c]pyridine-5-one;
8-chloro-5H[1]benzopyrano[2,3-b]pyridino-5-one;
8-bromo-5H[1]benzopyrano[2,3-b]pyridine-5-one;
8-methoxy-5H[1]benzopyrano[2,3-b]pyridine-5-one;
7,8-dimethoxy-5H[1]benzopyrano[2,3-b]pyridine-5-one;
7,8-dihydroxy-5H[1]benzopyrano[2,3-b]pyridine-5-one; and
7-chloro-5H[1]benzopyrano[2,3-b]pyridine-5-one;

respectively.

PREPARATION OF CARBINOLS

Example VI 5-hydroxy-5-(N-methyl-4-piperidyl)5H[1]
benzopyrano[2,3-b]pyridine Dissolve 5 g. of sodium metal in about 500 ml. of anhydrous liquid ammonia and add a suspension containing 19.7 g. of 5H[1]benzopyrano[2,3-b]pyridine-5-one in 250 ml. of anhydrous tetrahydrofuran. Stir the resulting mixture for 25–30 min. and add a solution containing 13.3 g. of freshly distilled N-methyl-4-chloropiperidine in 20 ml. of tetrahydrofuran. Stir the reaction mixture for 4–6 hours and allow the mixture to stand for an additional 14 hours. Add liquid ammonia and 20 g. of ammonia chloride. Decompose the reaction mixture by the dropwise addition of about 100 ml. of water and extract the mixture with chloroform. Water-wash and evaporate the chloroform solvent and triturate the residue from petroleum ether. Recrystallize the product from benzene petroleum ether mixture to yield the carbinol of this example, M.P. 208–210° C.

Example VII 7-chloro-5-hydroxy-5(N-methyl-4-piperidylidene)
5H[1]benzopyrano[2,3-b]pyridine Prepare the Grignard reagent from 7.2 g. of magnesium metal and 48.9 g. of N-methyl-4-chloro-piperidine in 300 ml. of tetrahydrofuran and employing a crystal of iodine and 1 cc. of ethylene dibromide as a catalyst, reflux the mixture until the magnesium metal is consumed (2–3 hours) and cool the mixture to room temperature. Add a suspension of 21.5 g. of 5H-[1]benzopyrano[2,3-b]pyridine-5-one in 200 ml. of tetrahydrofuran and stir the resulting mixture for 6–8 hours at room temperature. Decompose the reaction with ammonium chloride solution (10%) and extract with chloroform. Concentrate to a residue and recrystallize from ether to obtain the carbinol of this example, M.P. 181–185° C.

PREPARATION OF UNSATURATED COMPOUNDS BY DEHYDRATION OF CARBINOLS

Example VIII 5-(N-methylyl-4-piperidylidene)-5H[1]
benzopyrano[2,3-b]pyridine Heat on a steam bath for 20–24 hours a mixture containing 10 g. of the carbinol of Example VI and 400 g. of polyphosphoric acid. Pour the mixture into ice water and make alkaline with sodium hydroxide. Extract with chloroform. Water wash the chloroform extract and concentrate to a residue. Recrystallize the residue from acetonitrile and ethyl acetate to yield 5-(N-methyl-4-piperidylidene)-5H[1]benzopyrano[2,3-b]pyridine, M.P. 125–217° C.

Example IX 5-(N-methyl-4-piperidylidene)-5H[1]
benzopyrano[2,3-b]pyridine

Stir at room temperature a mixture of 10 g. of the carbinol of Example VI with 200 ml. of 85% sulfuric acid for 2 hours. Pour the resulting mixture into ice and neutralize with sodium hydroxide. Extract with chloroform, water wash and concentrate the chloroform extract to a residue. Recrystallize the product from acetonitrile and ethyl acetate.

Example X

5(N-trifluoroethyl-4-piperidylidene)5H[1]benzopyrano-
[2,3-b]pyridine hydrochloride To a solution containing 21.2 g. of cyanogenbromide in 100 ml. of benzene add a solution containing 59.6 g. of 5(N - methyl - 4 - piperidylidene) - 5H[1]benzopyrano-[2,3-b]pyridine in 3 l. of acetone. Allow the solution to stir overnight at room temperature. Filter and concentrate the filtrate to a residue. Add petroleum ether to the residue, filter the product and recrystallize the product from ethanol water. Dissolve the N-cyano intermediate in a mixture containing 60 ml. of hydrochloric acid and 600 ml. of acetic acid and 400 ml. of water and reflux the resulting mixture with stirring for 20 hours. Concentrate the resulting solution to dryness. Neutralize with ammonium hydroxide and extract with chloroform. Evaporate off the chloroform and recrystallize the residue from hexane to yield 5(4-piperidylidene)5H[1]benzopyrano[2,3-b]pyridine. Prepare a solution containing 13.2 g. of 5(4-piperidylidene)5H[1]benzopyrano[2,3-b]pyridine in 150 ml. of xylene and add 6 g. of trifluoroethyl trichloromethane sulfonate and reflux the resulting mixture for 15 hours. Cool and filter the reaction mixture and evaporate the xylene. Extract the residue several times with refluxing petroleum ether. Concentrate the petroleum ether extracts to incipient recrystallization. Recrystallize from hexane, M.P. 123–125° C.

Thus, by the employment of the appropriate starting reactants and by following the procedures of the foregoing examples, there is produced:

10(N-methyl-3-piperidylidene)-10H[1]benzopyrano [3,2-b]pyridine;
10(N-methyl-3-piperidylidene)-10H[1]benzopyrano [3,2-b]pyridine;
10(3-quinuclidylidene)-10H[1]benzopyrano[3,2-b] pyridine;
10(N-trifluoroethyl-4-piperidylidene)10H[1] benzopyrano[3,2-b]pyridine;
10(N-trifluoroethyl-3-piperidylidene)-10H[1] benzopyrano[3,2-b]pyridine;
10(3-dimethylaminopropylidene)-10H[1]benzopyrano [3,2-b]pyridine;
10(3-dimethylamino-2-methylpropylidene)-10H[1] benzopyrano[3,2-b]pyridine;
10(3-methylaminopropylidene)-10H[1]benzopyrano [3,2-b]pyridine;
10(dimethylaminoethylidene)-10H[1]benzopyrano [3,2-b]pyridine;
10(N-methyl-4-piperidylidene)-10H[1]benzopyrano [3,2-c]pyridine;
10(N-methyl-3-piperidylidene)10H[1]benzopyrano [3,2-c]pyridine;
10(N-methyl-3-quinuclidylidene)-10H[1]benzopyrano [3,2-c]pyridine;
10(N-trifluoroethyl-4-piperidylidene)-10H[1] benzopyrano[3,2-c]pyridine;
10(N-trifluoroethyl-3-piperidylidene)-10H[1] benzopyrano[3,2-c]pyridine;
10(3-dimethylaminopropylidene)-10H[1]benzopyrano [3,2-c]pyridine;

10(3-dimethylamino-2-methylpropylidene)10H[1]
benzopyrano[3,2-c]pyridine;
10(3-methylaminopropylidene)-10H[1]benzopyrano-
[3,2-c]pyridine;
10(dimethylaminoethylidene)-10H[1]benzopyrano
[3,2-c]pyridine;
and the 7-chloro,7-bromo-7-methoxy, 7,8-dimethoxy, 7,8-dihydroxy, 8-chloro and other Q-substituted analogs of each of the foregoing, and 5-(N-methyl-4-piperidylidene)-5H[1]benzopyrano
[2,3-c]pyridine;
5-(N-methyl-3-piperidylidene)-5H[1] benzopyrano
[2,3-c]pyridine;
5(3-quinuclidylidene)5H[1]benzopyrano[2,3-c]
pyridine;
5(N-trifluoroethyl-4-piperidylidene)5H[1]benzopyrano
[2,3-c]pyridine;
5(N-trifluoroethyl-3-piperidylidene)5H[1]benzopyrano
[2,3-c]pyridine;
5(3-dimethylaminopropylidene)5H[1]benzopyrano
[2,3-c]pyridine;
5(dimethylamino-α-methyl-propylidene)5H[1]
benzopyrano[2,3-c]pyridine;
5(3-methylaminopropylidene)5H[1]benzopyrano
[2,3-c]pyridine;
5-(dimethylaminoethylidene)5H[1]benzopyrano
[2,3-c]pyridine;
5(N-methyl-4-piperidylidene)5H[1]benzopyrano
[2,3-b]pyridine;
5(N-methyl-3-piperidylidene)5H[1]benzopyrano
[2,3-b]pyridine;
5(3-quinuclidylidene)5H[1]benzopyrano
[2,3-b]pyridine;
5(N-trifluoroethyl-4-piperidylidene)5H[1]benzopyrano
[2,3-b]pyridine;
5(N-trifluoroethyl-3-piperidylidene)5H[1]benzopyrano
[2,3-b]pyridine;
5(3-dimethylaminopropylidene)5H[1]benzopyrano
[2,3-b]pyridine;
5(3-dimethylaminopropylidene)5H[1]benzopyrano
[2,3-b]pyridine;
5(dimethylamino-α-methyl-propylidene)5H[1]
[2,3-b]pyridine;
5(3-methylaminopropylidene)5H[1]benzopyrano
[2,3-b]pyridine;
5(dimethylaminoethylidene)5H[1]benzopyrano
[2,3-b]pyridine and the 8-chloro, 8-bromo, 8-methoxy, 7,8-dimethoxy, 7,8-dihydroxy, 7-chloro, 8-hydroxy and other Q-substituted analogs of each of the foregoing, said compounds also being amenable to hydrogenation procedures of the examples described hereinbelow to produce the saturated analog thereof.

PREPARATION OF SATURATED COMPOUNDS

Example XI

5(N-methyl-4-piperidyl)5H[1]benzopyrano[2,3-b]
pyridine

Hydrogenate in a Parr shaker a solution of 6.8 of 5-(N - methyl - 4 - piperidylidene)5H[1]benzopyrano[2,3-b]pyridine in 100 ml. of ethanol in the presence of 0.5 g. of platinum oxide under 50 lbs. pressure of hydrogen until an equivalent quantity of hydrogen is absorbed. Filter and concentrate the filtrate to a residue and recrystallize the residue from petroleum ether.

PREPARATION OF ACID ADDITION SALTS

Example XII

5(N-methyl-4-piperidylidene)5H[1]benzopyrano
[2,3-b]pyridine maleate

Dissolve 13.9 g. of 5(N-methyl-4-piperidylidene)5H-[1]benzopyrano[2,3-b]pyridine in 50 ml. of ethyl acetate. Add a solution of 5.8 g. of maleic acid in 100 ml. or refluxing ethylacetate and reflux for 10 min. Allow to cool, filter and recrystallize from ethanol ether to yield 5(N-methyl - 4 - piperidylidene)5H[1]benzopyrano[2,3 - b] pyridine maleate, M.P. 204–206° C.

Example XIII 5-quinuclidylidene-5H[1]benzopyrano[2,3-]pyridine

Step I.—Dissolve 8.7 g. of sodium metal in 1 l. of anhydrous ammonia. With vigorous stirring add a dropwise solution of 32.6 g. of 5H[1]benzopyrano[2,3-b]pyridine-5-one in about 600 ml. dry tetrahydrofuran and stir for an additional 0.5 hr. Then add a solution of 24 g. of 3-chloroquinuclidine in 30 ml. of tetrahydrofuran and stir overnight. Add 30 g. of solid ammonium chloride, allow the excess ammonia to evaporate and cautiously add about 200 ml. of water and remove the tetrahydrofuran by distillation in vacuo. Extract the product with chloroform, wash the chloroform extracts with water and concentrate to a residue. The product, after recrystallization from ethanol, yields 5-OH-5(3-quinuclidene)5H-[1]-benzopyrano[2,3-b]pyridine maleate, M.P. 248–250° C.

Step II.—Prepare a solution of 24 g. of carbinol from Step I, 21 g. of p-toluenesulfonic acid and 600 ml. of acetic anhydride. Heat this solution for 5 hrs. on a steam bath, pour into ice water, and basify with 50% sodium hydroxide. Filter the product and recrystallize from chloroform-hexane to give the produce of this example having a M.P. of 198–200° C.

Step III.—Dissolve 5 g. of the quinuclidylidene derivative from Step II in 200 ml. of anhydrous ether and add a saturated solution of hydrogen chloride gas in ethanol until precipitation is complete. Filter the product and recrystallize from ethanol to yield 5-(3-quinuclidylidene) 5H[1]-benzopyrano[2,3-b]pyridine hydrochloride, M.P. 312–314° C.

Having described the preparation of the compounds of this invention, the process by which these compounds may be used as therapeutic agents will be described.

The compounds of this invention possess the inherent applied-use characteristic of relaxing the bronchial muscle. Thus, the compounds of this invention may be characterized as bronchodilators useful in the treatment of pulmonary disorders characterized by broncho-congestion and/or broncho-constriction, such as bronchitis, emphysema, bronchial asthma, pulmonary edema and pneumoconiosis.

It has also been found from the results of a modified histamine-aerosol test (designed to measure the effect of medicaments on the time-of-onset of histamine induced dyspnea) that the compounds of this invention greatly increase the time required to induce dyspnea in animals (e.g. guinea pig). This test is collaterally a measure of the medicament's ability to dilate the bronchial muscle in vivo and may be used for side-by-side comparison with commercially available bronchodilators. In other words, the compound actually causes a dilatation of the bronchial muscle rather than only counteracting the effects of the histamine present.

In addition to the foregoing assay methods it is also found that the compounds are effective in the anti-IgE screen (PCA) (see Journal of Parasitology, vol. 53, p. 752, 1967). The compounds of this invention have been found to be more effective in this assay (e.g. at 0.2–2.5 mg./kg. of body weight) for the prevention of the release of histamine than other prior art anti-histamines even though these prior art anti-histamines are known to have a greater potency in clinical anti-histamine assays. This suggests that the mechanism of action of the compounds of this invention is indeed unique. Indeed, according to another assay technique (see Journal of Immunology, vol. 100, p. 622, 1968), it is found that the compounds of this invention exhibit inhibition of histamine release from isolated rat peritoneal mast cells. The preferred compounds of this invention block histamine release according to the foregoing assay at $10^{-3}$ to $10^{-5}$ molar concentrations.

In practice, based upon standard pharmacological animal studies, particularly in the guinea pig, it has been found that oral administration 0.1–5 mg./kg. of animal body weight per dose will elicit the desired bronchodilating effect, that said dose may be administred from 1–4 times per day.

Of course, in all instances the optimum daily oral dose level useful in the control of the pulmonary disorder will vary depending upon the potency of the specific compound, the severity of the condition being treated, as well as the reaction sensitivity of the animal host being treated.

As is true for most classes of therapeutically useful compounds, certain sub-classes and certain specific compounds are found to be more effective than other members of the general class. Of the compounds of this invention amino alkylidene derivatives, i.e. those compounds designated by >C=D of Formula I are preferred bronchodilators. Especially preferred compounds are those derivatives bearing N-methyl-4-piperidylidene, dimethyl-aminopropylidene, dimethylaminomethylidene, N - trifluoroethyl-4-piperidylidene and 3-quinuclidylidene substituents in the 5-position of the aza-xanthene nucleus. Preferred aza-xanthenes are the 1-aza isomers of Formula I (i.e. those 5H[1]benzopyrano]2,3-b]pyridines having the foregoing aminoalkylidene substituents. Of particular therapeutic interest is 5(N-methyl-4-piperidylidene)-5H[1]benzopyrano[2,3-b]pyridine because of its direct action upon the bronchi and thus such compound is especially suitable for oral application for its direct bronchodilating effects. Other compounds of particular interest for their bronchodilating effect are 5(3-quinuclidylidene)5H[1]benzopyrano[2,3-b]pyridine, 7 - chloro-5(N-methyl - 4 - piperidylidene)5H[1]benzopyrano[2,3-b]pyridine, 8-chloro-5(N-methyl-4-piperidylidene)5H[1]benzopyrano[2,3 - b]pyridine, 5-N-trifluoroethyl-4-piperidylidene)5H[1]benzopyrano[2,3-b]pyridine.

In addition to their use as bronchodilating agents, the compounds of this invention also exhibit useful CNS effects. For example, in the isolation-induced aggression in mice assay technique (C. Y. Yen, R. L. Stonger and N. Millman, Archives International Pharmacodynamie, vol. 123, pp. 179–185 (1959), the compounds exhibited antiagressive behavior at doses of 1–25 mpk/i.p. Particularly suitable for this therapeutic-use characteristics are the 3-aza xanthene compounds and in particular 10-dimethylaminopropylidene-10 H[1]benzopyrano[2,3-c]pyridine.

Further, the compounds also exhibit marked antiserotonin charactertistics, said characteristic being common to those compounds found useful in the treatment and alleviation of migraine headaches. Of particular interest are those compounds of Formula I wherein Z represents N-methyl-piperidylidene and Q represents hydrogen. Of particular interest is the fact that this anti-serotonin activity markedly increases as the nitrogen atom of the aza xanthene nucleus is moved from the 1- position to the 2- position, to the 3- position and finally to the 4- position, (i.e. as depicted in structures V, IV, III and II, respectively). Thus, 5 - (N-methyl-4-piperidylidene)10H[1]benzopyrano[3,2-b]pyridine is an extremely potent antiserotonin agent.

The therapeutic compositions of matter described herein may be administered parenterally, enterally or by inhalation techniques such as by the use of aerosols and other inhalation methods. Preferably, the compounds are orally administered, oral administration being best effected by incorporating the compounds of this invention into dosage forms such as tablets, capsules, elixirs, solutions, suspensions, and the like. Respective embodiments of the formulations containing the compositions of this invention are as described below.

TABLET FORMULATION

| Formula: | Mg./tablet |
|---|---|
| 5 - (N - methyl - 4 - piperidylidene) - 5H-[1]-benzopyrano[2,3-b]pyridine maleate | 100.00 |
| Citric acid | 1.00 |
| Lactose | 33.00 |
| Dicalcium phosphate | 70.00 |
| Pluronic, F–68 | 30.00 |
| Sodium lauryl sulfate | 15.00 |
| Polyvinylpyrrolidone | 15.00 |
| Carbowax 1500 | 5.00 |
| Carbowax 6000 | 45.00 |
| 3A alcohol 50 ml./1000 tablets | |
| Corn starch | 30.00 |
| Dry: | |
| Sodium lauryl sulfate | 3.00 |
| Magnesium stearate | 3.00 |
| Tablet weight | 350.00 |

Procedure.—Mix together the 5-(N-methyl-4-piperidylidene) - 5H[1] - benzopyrano[2,3-b]pyridine maleate, citric acid, pluronic F–68, sodium lauryl sulfate, lactose and dicalcium phosphate. Screen through No. 60 mesh screen. Granulate the screened mix with an alcoholic solution containing the polyvinylpyrrolidone. Carbowax 1500 and 6000. Add additional alcohol, if necessary, to bring powder mix to a pasty mass. Add corn starch and continue mixing until uniform damp granules are formed. Pass the damp granulation through a No. 10 screen and dry in an oven at 100° C. for 12–14 hours. Screen the dried granulation using a No. 16 screen, add sodium lauryl sulfate and magnesium stearate, mix and compress on a tablet machine to specifications.

CAPSULE FORMULATION

| Formula: | Mg./capsule |
|---|---|
| 5 - (N - methyl - 4 - piperidylidene) - 5H[1]-benzopyrano[2,3-b]pyridine maleate | 100.00 |
| Citric acid | 1.00 |
| Pluronic F–68 | 40.00 |
| Sodium lauryl sulfate | 20.00 |
| Lactose | 238.00 |
| Magnesium stearate | 1.00 |

Procedure.—Mix together the 5-(N-methyl-4-piperidylidene) - 5H[1]benzopyrano[2,3 - b]pyridine maleate, citric acid, pluronic F–68, sodium lauryl sulfate and lactose. Pass through a No. 80 screen. Add the magnesium stearate, mix and encapsulate into the proper size 2-piece gelatin capsule.

PARENTERAL FORMULATION

| Formula: | |
|---|---|
| 5 - (N - methyl - 4 - piperidylidene) - 5H[1] benzopyrano[2,3-b]pyridine maleate mg./10 | 200.0 |
| Benzyl alcohol, UF mg/10 ml | 50.0 |
| Methyl paraben, USP mg./10 ml | 18.0 |
| Propyl paraben,USP mg./10 ml | 2.0 |
| Water ml | 10 |

Procedure.—Dissolve the parabens in approximately 8.5 ml. of water at 60° to 70° C. Cool the solution to 40° C. and add the benzyl alcohol. Cool the resultant solution to room temperature and dissolve the 5-(N-methyl-4-piperidylidene)-5H[1]benzopyrano[2,3-b]pyridine maleate. Filter the solution through a sterilizing filter into a sterile receptacle. Fill suitably sized vials with the solution, cap loosely and autoclave for one-half hour at 121° C. (15 p.s.i.g.). Each milliliter of this formulation delivers 20 mgs. of active compound.

ELIXIR FORMULATION

Formula:

| | | |
|---|---|---|
| 5 - (N - methyl - 4 - piperidylidene) - 5H[1]benzopyrano[2,3-b]pyridine maleate | gm./liter | 10.0 |
| Sodium citrate, USP | do | 10.0 |
| Sodium benzoate, USP | do | 1.0 |
| Sorbitol solution, USP | do | 200.0 |
| Propylene glycol, USP | do | 50.0 |
| Sucrose, food grade | do | 600.0 |
| Peppermint oil | ml | 0.1 |
| Purified water, USP, q.s. to make | liters | 1.0 |

Procedure.—Dissolve successively the sodium citrate, sodium benzoate, 5-(N-methyl-4-piperidylidene)-5H[1]benzopyrano[2,3-b]pyridine maleate in approximately 300–400 ml. of purified water with stirring and moderate warming. Add the sorbitol solution, propylene glycol and sucrose and stir until homogeneous. Cool the mix to room temperature and add the peppermint oil flavor. Add 5 gms. of a suitable filter and (Hi flow Super-Cel-Johns-Manville) and filter the solution. Adjust the volume of the solution to 1.0 liter with additional purified water. Bottle the elixir in suitable sized containers. Each teaspoon (5 ml.) of this formation delivers 50 mg. of the active (bronchodilator) ingredient.

I claim:

1. A compound having the structural formula:

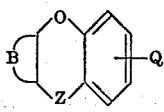

and the pharmaceutically acceptable acid addition salts thereof, wherein B, together with the carbon atoms to which it is attached, represents a fused pyridine ring, Q is a member of the group consisting of hydrogen, halogen, lower alkyl, lower alkoxy and hydroxy, Z is a member of the group consisting of

and

wherein A is a member of the group consisting of piperidyl, quinuclidyl and

W is a member of the group consisting of H and OH, and D is a member of the group consisting of piperidylidene, quinuclidylidene and

wherein $R_1$ and $R_2$ are members of the group consisting of hydrogen and lower alkyl and X and Y are respectively saturated lower aliphatic hydrocarbyl and hydrocarbylidene radicals containing two to four carbon atoms.

2. A compound of claim 1 having the structural formula:

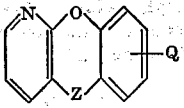

and the pharmaceutically acceptable acid addition salts thereof, wherein Q is a member of the group consisting of hydrogen, lower alkyl, halogen, lower alkoxy and hydroxy, Z is a member of the group consisting of

and

wherein A is a member of the group consisting of piperidyl, quinuclidyl and

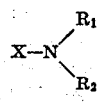

W is a member of the group consisting of H and OH, and D is a member of the group consisting of piperidylidene, quinuclidylidene and

wherein $R_1$ and $R_2$ are members of the group consisting of hydrogen and lower alkyl and X and Y are respectively saturated lower aliphatic hydrocarbyl and hydrocarbylidene radicals containing two to four carbon atoms.

3. A compound of claim 1 having the structural formula:

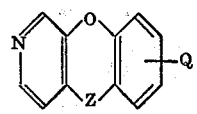

and the pharmaceutically acceptable acid addition salts thereof, wherein Q is a member of the group consisting of hydrogen, lower alkyl, halogen, lower alkoxy and hydroxy, Z is a member of the group consisting of

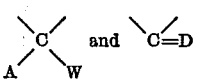

wherein A is a member of the group consisting of piperidyl, quinuclidyl and

W is a member of the group consisting of H and OH, and D is a member of the group consisting of piperidylidene, quinuclidylidene and

wherein $R_1$ and $R_2$ are members of the group consisting of hydrogen and lower alkyl and X and Y are respectively saturated lower aliphatic hydrocarbyl and hydrocarbylidene radicals containing two to four carbon atoms.

4. A compound of claim 1 having the structural formula:

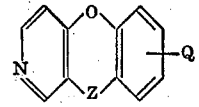

and the pharmaceutically acceptable acid addition salts thereof, wherein Q is a member of the group consisting of hydrogen, lower alkyl, halogen, lower alkoxy and hydroxy, Z is a member of the group consisting of

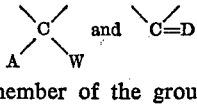

wherein A is a member of the group consisting of piperidyl, quinclidyl and

W is a member of the group consisting of H and OH, and D is a member of the group consisting of piperidylidene, quinuclidylidene and

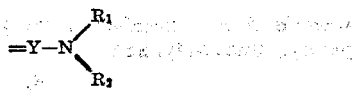

wherein $R_1$ and $R_2$ are members of the group consisting of hydrogen and lower alkyl and X and Y are respectively saturated lower aliphatic hydrocarbyl and hydrocarbylidene radicals containing two to four carbon atoms.

5. A compound of claim 1 having the structural formula:

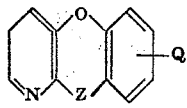

and the pharmaceutically acceptable acid addition salts thereof, wherein Q is a member of the group consisting of hydrogen, lower alkyl, halogen, lower alkoxy and hydroxy, Z is a member of the group consisting of

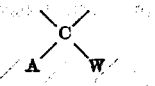

and C=D wherein A is a member of the group consisting of piperidyl, quinuclidyl and

W is a member of the group consisting of H and OH, and D is a member of the group consisting of piperidylidene, quinculidylidene and

wherein $R_1$ and $R_2$ are members of the group consisting of hydrogen and lower alkyl and X and Y are respectively saturated lower aliphatic hydrocarbyl and hydrocarbylidene radicals containing two to four carbon atoms.

6. A compound of claim 1 having the structural formula:

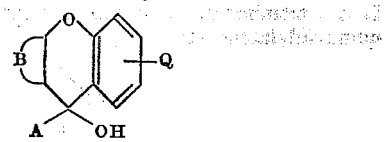

and the pharmaceutically acceptable acid addition salts thereof, wherein B, together with the carbon atoms to which it is attached, represents a fused pyridine ring, Q is a member of the group consisting of hyrogen, lower alkyl, lower alkoxy, halogen and hydroxy, and A is a member of the group consisting of piperidyl quinuclidyl and

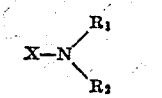

7. A compound of claim 1 having the structural formula:

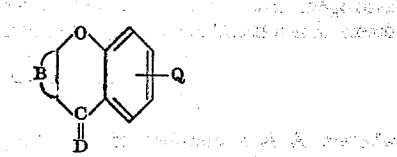

and the pharmaceutically acceptable acid addition salts thereof, wherein B, together with the carbon atoms to which it is attached, represents a fused pyridine ring, Q is a member of the group consisting of hydrogen, lower alkyl, halogen, lower alkoxy and hydroxy, and D is a member consisting of piperidylidene, quinuclidylidene and

wherein $R_1$ and $R_2$ are members of the group consisting of hydrogen and lower alkyl and Y is a saturated lower aliphatic hydrocarbylidene radical containing two to four carbon atoms.

8. A compound of claim 1 having the structural formula:

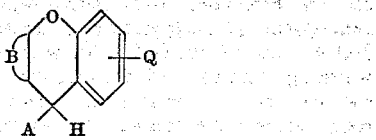

and the pharmaceutically acceptable acid addition salts thereof, wherein B, together with the carbon atoms to which it is attached, represents a fused pyridine ring, Q is a member of the group consisting of hydrogen, lower alkyl, halogen, lower alkoxy and hydroxy, and A is a member of the group consisting of piperidyl, quinuclidyl and

9. A compound of claim 7 having the sturctural formula:

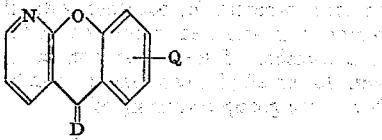

and the pharmaceutically acceptable acid addition salts thereof, wherein Q is a member of the group consisting of hydrogen, lower alkyl, halogen, lower alkoxy and hydroxy, and D is a member of the group consisting of piperidylidene, quinuclidylidene and

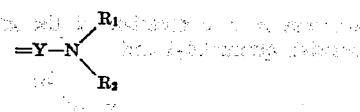

wherein $R_1$ and $R_2$ are members of the group consisting of hydrogen and lower alkyl and Y is a saturated lower aliphatic hydrocarbylidene radical containing two to four carbon atoms.

10. A compound of claim 1 having the structural formula:

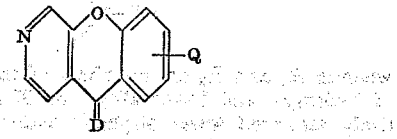

and the pharmaceutically acceptable acid addition salts thereof, wherein Q is a member of the group consisting of hydrogen, lower alkyl, halogen, lower alkoxy and hydroxy and D is a member of the group consisting of piperidylidene, quinuclidylidene and

wherein $R_1$ and $R_2$ are members of the group consisting of hydrogen and lower alkyl and Y is a saturated lower aliphatic hydrocarbylidene radical containing two to four carbon atoms.

11. A compound of claim 1 having the structural formula:

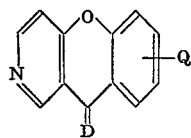

and the pharmaceutically acceptable acid addition salts thereof, wherein Q is a member of the group consisting of hydrogen, lower alkyl, halogen, lower alkoxy and hydroxy and D is a member of the group consisting of piperidylidene, quinuclidplidene and

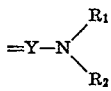

wherein $R_1$ and $R_2$ are members of the group consisting of hydrogen and lower alkyl and Y is a saturated lower aliphatic hydrocarbylidene radical containing two to four carbon atoms.

12. A compound of claim 1 having the structural formula:

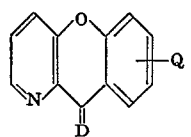

and the pharmaceutically acceptable acid addition salts thereof, wherein Q is a member of the group consisting of hydrogen, lower alkyl, halogen, lower alkoxy and hydroxy and D is a member of the group consisting of piperidylidene, quinuclidylidene and

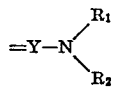

wherein $R_1$ and $R_2$ are members of the group consisting of hydrogen and lower alkyl and Y is a saturated lower aliphatic hydrocarbylidene radical containing two to four carbon atoms.

13. A compound of claim 7 wherein D represents

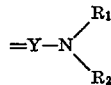

with Y being propylidene.

14. A compound of claim 7 wherein D represents N-methyl-4-piperidylidene.

15. A compound of claim 7 wherein D represents 3-quinuclidylidene.

16. A compound of claim 7 wherein D represents

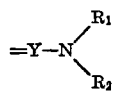

with Y being ethylidene.

17. A compound of claim 13 wherein the benzopyrano tricyclic nucleus is a 5H[1]benzopyrano[2,3-b]pyridine.

18. A compound of claim 14 wherein the benzopyrano tricyclic nucleus is a 5H[1]benzopyrano[2,3-b]pyridine.

19. A compound of claim 15 wherein the benzopyrano tricyclic nucleus is a 5H[1]benzopyrano[2,3-b]pyridine.

20. A compound of claim 16 wherein the benzopyrano tricyclic nucleus is 5H[1]benzopyrano[2,3-b]pyridine.

21. A compound of claim 13 wherein the benzopyrano tricyclic nucleus is 10H[1]benzopyrano[2,3-c]pyridine.

22. A compound of claim 7 wherein Q is hydrogen, said compound being 5(dimethylaminopropylidene)5H[1]-benzopyrano[2,3-b]pyridine.

23. A compound of claim 7 wherein Q is hydrogen, said compound being 5(dimethylaminopropylidene)5H[1]-benzopyrano[2,3-c]pyridine.

24. A compound of claim 7 wherein Q is hydrogen, said compound being 10(dimethylaminopropylidene)10H[1]-benzopyrano[3,2-b]pyridine.

25. A compound of claim 7 wherein Q is hydrogen, said compound being 10(dimethylaminopropylidene)10H[1]-benzopyrano[3,2-c]pyridine.

26. A compound of claim 7 wherein Q is hydrogen, said compound being 5-(N-methyl-4-piperidylidene)-5H[1]-benzopyrano[2,3-b]pyridine.

27. A compound of claim 7 wherein Q is hydrogen, said compound being 5-(N-methyl-4-piperidylidene)-5H[1]-benzopyrano[2,3-c]pyridine.

28. A compound of claim 7 wherein Q is hydrogen, said compound being 10-(N-methyl-4-piperidylidene)-10H[1]-benzopyrano[3,2-b]pyridine.

29. A compound of claim 7 wherein Q is hydrogen, said compound being 10-(N-methyl-4-piperidylidene)-10H[1]benzopyrano[3,2-c]pyridine.

30. A compound of claim 19 wherein Q represents hydrogen, said compound being 5-(3-quinuclidylidene) 5H[1]benzopyrano[2,3-b]pyridine.

31. A compound of claim 20 wherein Q represents hydrogen, said compound being 5(dimethylaminoethylidene) 5H[1]benzopyrano[2,3-b]pyridine.

32. A compound of claim 7 wherein D represents N-2',2',2'-trifluoroethyl-4-piperidylidene.

References Cited
UNITED STATES PATENTS 2,985,660   5/1961   Judd et al. _____ 260—293
3,470,188   9/1969   Kaiser et al. _____ 260—293.4

HENRY R. JILES, Primary Examiner

G. T. TODD, Assistant Examiner

U.S. Cl. X.R.

260—293.58, 294.9, 195 R, 295 T, 296 H, 297 R, 297 T; 424—263, 267